United States Patent
Nemeth

(10) Patent No.: US 9,135,539 B1
(45) Date of Patent: Sep. 15, 2015

(54) BARCODE PRINTING BASED ON PRINTING DATA CONTENT

(71) Applicant: Black Ice Software, Inc., Nashua, NH (US)

(72) Inventor: Jozsef Nemeth, St. John, VI (US)

(73) Assignee: Black Ice Software, LLC, Nashua, NH (US)

( * ) Notice: Subject to any disclaimer, the term of this patent is extended or adjusted under 35 U.S.C. 154(b) by 12 days.

(21) Appl. No.: 14/259,448

(22) Filed: Apr. 23, 2014

Related U.S. Application Data

(60) Provisional application No. 61/814,953, filed on Apr. 23, 2013.

(51) Int. Cl.
*G06F 15/00* (2006.01)
*G06F 3/12* (2006.01)
*G06K 1/00* (2006.01)
*G06K 15/02* (2006.01)

(52) U.S. Cl.
CPC .......... *G06K 15/1868* (2013.01); *G06K 15/181* (2013.01)

(58) Field of Classification Search
CPC ............. G05K 15/1868; G05K 15/181; G06F 3/1297; G06F 3/1296
USPC ......................................... 358/1.13, 3.28, 1.1
See application file for complete search history.

(56) References Cited

U.S. PATENT DOCUMENTS

| | | |
|---|---|---|
| 5,699,495 A | 12/1997 | Snipp |
| 5,995,723 A | 11/1999 | Sperry et al. |
| 6,266,150 B1 | 7/2001 | Brossman et al. |
| 6,538,763 B1 | 3/2003 | Klosterman et al. |
| 6,707,568 B1 | 3/2004 | Yu |
| 6,757,071 B1 | 6/2004 | Goodman et al. |
| 7,106,472 B2 | 9/2006 | Gomez et al. |
| 7,227,657 B1 | 6/2007 | Haltmeyer |
| 7,256,901 B2 | 8/2007 | Ferlitsch |
| 7,319,533 B2 | 1/2008 | Ferlitsch |
| 7,471,405 B2 | 12/2008 | Sabbagh et al. |
| 7,480,068 B2 | 1/2009 | Ferlitsch |
| 7,643,160 B2 | 1/2010 | Kadota |
| 7,689,673 B2 | 3/2010 | Kemp et al. |
| 7,710,602 B2 | 5/2010 | Owen |
| 7,810,025 B2 | 10/2010 | Blair et al. |
| 8,274,677 B2 | 9/2012 | Asano |

(Continued)

FOREIGN PATENT DOCUMENTS

| | | |
|---|---|---|
| JP | 09167063 | 6/1997 |
| WO | 2009053738 A1 | 4/2009 |

*Primary Examiner* — Douglas Tran
(74) *Attorney, Agent, or Firm* — Maine Cernota & Rardin

(57) ABSTRACT

A method and system is provided for printing a barcode computed based on content of a printed page data system on a document, the method comprising: using a methodology of regular expression; applying a regular expression subsystem to text contained in a print stream generating data; converting the data to a barcode applying barcode computation, to produce a bitmap barcode representing the barcode; inserting the bitmap barcode into an Enhanced Meta File (EMF) print stream defined by the printing system in the Port Monitor or Print Processor subsystem; inserting the bitmap barcode into an XML Paper Specification (or XPS) print stream defined by the printing system in the Port Monitor or Print Processor subsystem; and combining the barcode with the print stream to contain the barcode in a specific position in the print stream in the Port Monitor or Print Processor subsystem.

10 Claims, 1 Drawing Sheet

(56) References Cited

U.S. PATENT DOCUMENTS

| | | |
|---|---|---|
| 2003/0014445 A1 | 1/2003 | Formanek et al. |
| 2003/0184782 A1 | 10/2003 | Perkins et al. |
| 2006/0262336 A1 | 11/2006 | Venkatachalam et al. |
| 2009/0195810 A1 | 8/2009 | Sprague et al. |
| 2011/0292077 A1* | 12/2011 | Lapstun et al. ............... 345/632 |
| 2014/0240735 A1* | 8/2014 | Salgado ....................... 358/1.13 |

* cited by examiner

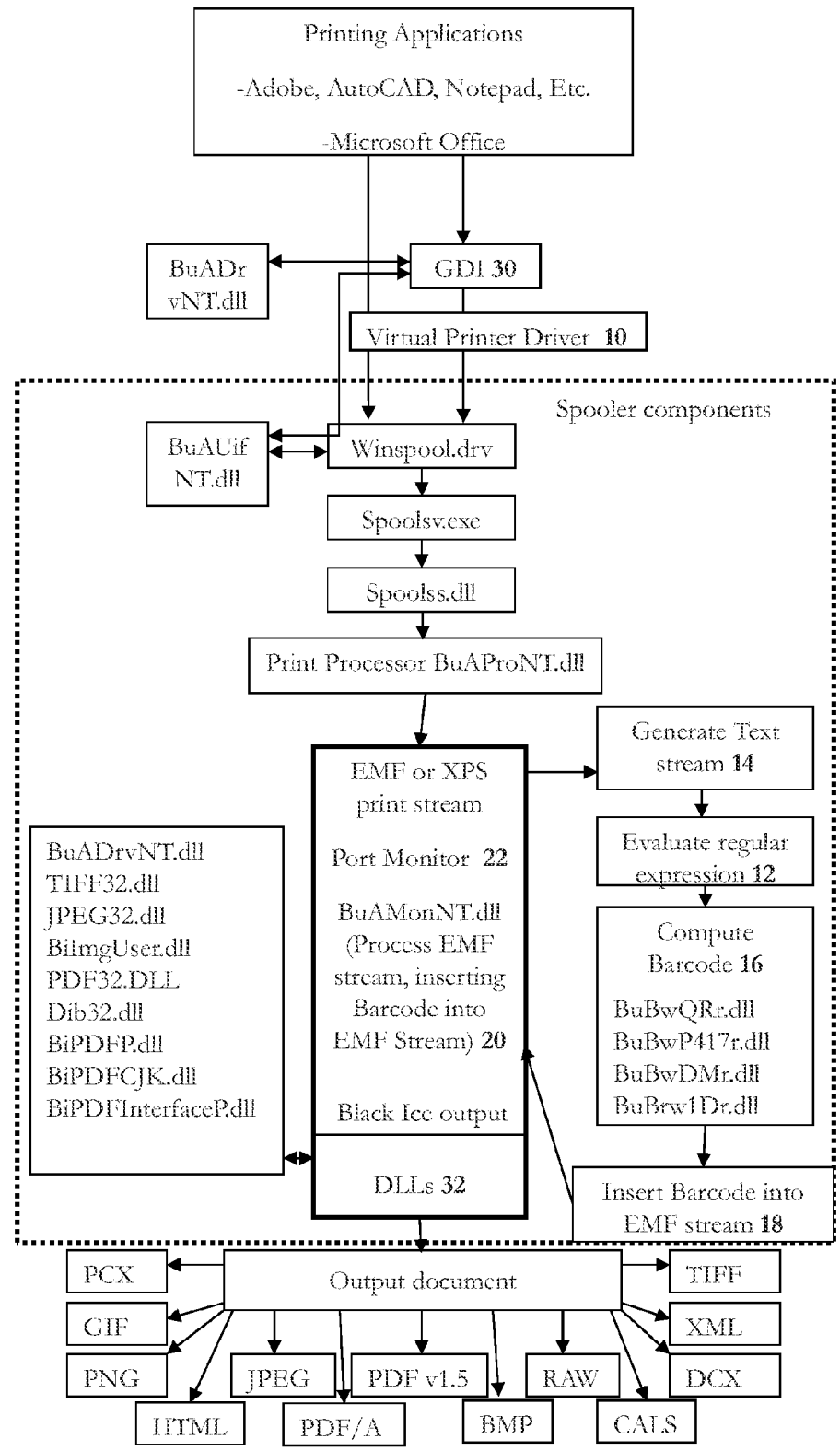

BARCODE PRINTING BASED ON PRINTING DATA CONTENT

RELATED APPLICATIONS

This application claims the benefit of U.S. Provisional Application No. 61/814,953, filed Apr. 23, 2013. This application is herein incorporated by reference in its entirety for all purposes.

FIELD OF THE INVENTION

The invention relates to barcode printing, and more particularly, to a method and system for the insertion of a content based barcode into a print stream.

SUMMARY OF THE INVENTION

One embodiment of the present invention provides a method of printing a barcode computed based on content of a printed page data system on a document, the method comprising: using a methodology of regular expression; applying a regular expression subsystem to text contained in a print stream generating data; converting the data to a barcode applying barcode computation, to produce a bitmap barcode representing the barcode; inserting the bitmap barcode into an Enhanced Meta File (EMF) print stream defined by the printing system in the Port Monitor or Print Processor subsystem; inserting the bitmap barcode into an XML Paper Specification (or XPS) print stream defined by the printing system in the Port Monitor or Print Processor subsystem; and combining the barcode with the print stream to contain the barcode in a specific position in the print stream in the Port Monitor or Print Processor subsystem.

Another embodiment of the present invention provides such a method further comprising controlling a characteristic of the printing process via a user interface.

A further embodiment of the present invention provides such a method wherein the characteristic is at least one characteristic selected from the group of characteristics consisting of the Barcode type, size, location on the printed document, and the source of ASCII or UNICODE text data.

Still another embodiment of the present invention provides such a method wherein the print stream outputs a computer file.

A still further embodiment of the present invention provides such a method wherein the computer file is in a format selected from the group of formats consisting of PDF, HTML, XML, JPEG, TIFF, PNG, and GIF.

One embodiment of the present invention provides a system for the printing of a barcode derived from the content of a printed page data system on a document, the system comprising: a virtual print driver; a generate text subsystem generating a stream of text from a file being printed by the virtual print driver; a regular expression subsystem reading the text and providing a set of text data; a barcode computing module converting the text data to a barcode bitmap; a port monitor subsystem receiving the barcode bitmap and inserting the barcode bitmap in a predefined position in a print data stream.

Another embodiment of the present invention provides such a system further comprising a print driver user interface allowing a user to modify characteristics of the print driver.

A further embodiment of the present invention provides such a system wherein the barcode subsystem comprises a dynamically linked library.

Still another embodiment of the present invention provides such a system wherein the dynamically linked library comprises executable computer code to convert ASCII and/or binary text data to a barcode using a barcode standard specification.

A still further embodiment of the present invention provides such a system wherein the virtual print driver further comprises a application programming interface.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1 is a flow chart illustrating a method for the insertion of a content based bar code into a print stream configured in accordance with one embodiment of the present invention.

DETAILED DESCRIPTION

In one embodiment of the present invention, a page print is started. A barcode value is computed based on the data content of the printed page. The barcode is inserted into a print page EMF data stream in predefined position on the page. The page printing is completed with the barcode printed on the page.

As illustrated in FIG. 1, one embodiment of the present invention is executed on the Microsoft Windows Operating System with the capability of printing. Such an embodiment provides a printing process transfers formatted data, through the Operating System printing subsystem Spooler, from the application to a physical printer attached to a commuting device including but not limited by common devises such as Personal computer, tablet, smart phone or to a Virtual printer driver. In case of physical printer, the output is generated on a media such as paper, plastic, etc. In case of virtual printer, the output is generated in a form of a file on a storage device or on a virtual file in memory.

The virtual printer driver 10 is a piece of computer software whose user interface and functionality resembles that of a physical printer, but the virtual printer driver 10 prints to a file on a storage device or on a virtual file in memory and may be or may not be connected with a physical printer.

The virtual printer driver 10 can insert the computed Barcode into the print stream during printing from three distinct sources.

In one embodiment of the present invention, the virtual printer driver 10 extracts ASCII text or UNICODE text date during printing from the print stream in the Port Monitor 22, and writes the data into a separate file X 14. The Regular Expression subsystem 12 reads the file X 14 and processes and computes a barcode value based on the printed data content in file X 14, by performing a regular expression computation on the printed data. The regular expression process generates a new set of ASCII text or UNICODE text data that is passed to the barcode computing module 16 through an Application Programming Interface (API) to compute the barcode. The barcode computing subsystem 16 outputs a barcode represented by a bitmap. The generated barcode is passed to the Virtual printer driver 10 subsystem of Port Monitor 22. The Port Monitor 22 subsystem inserts the barcode 18 represented by a bitmap into a predefined position into the EMF or XPS print data stream 20.

The print stream is represented by an EMF or XPS data stream and is static data in the Port Monitor 22. The port Monitor 22 will convert the EMF or XPS data stream to a predefined file format by passing the EMF or XPS data stream to the File Converter subsystem. The file converter subsystem writes the file to the storage device or to a virtual file in memory.

The Enhanced Metafile format (or EMF) and the XML Paper Specification (or XPS) document format consists of structured XML markup that defines the layout of a document and the visual appearance of each page. The EMF and XPS data stream is commonly used in Microsoft Operating Systems by the GDI and the Spooler printing subsystem.

In an alternative embodiment of the present invention, the virtual printer reads a predefined file Y that contains ASCII text or UNICODE text data. The virtual printer driver 10 passes the ASCII text or UNICODE text data passed to the barcode computing module 16 through an Application Programming Interface (API) to compute the barcode. The barcode computing module 16 outputs a barcode represented by a bitmap 18. The generated barcode is passed to the Virtual printer driver 10 subsystem of Port Monitor 22. The Port Monitor 22 subsystem inserts the barcode represented by a bitmap into a predefined position into the EMF or XPS print data stream.

In an alternative embodiment of the present invention, the virtual printer 10 reads a predefined User Interface data from memory, that contains ASCII text or UNICODE text data. The virtual printer driver 10 passes the ASCII text or UNICODE text data to the barcode computing module through an Application Programming Interface (API) to compute the barcode 16. The barcode computing module 16 outputs a barcode represented by a bitmap. The generated barcode represented by a bitmap is passed to the virtual printer driver 10 subsystem of Port Monitor 22. The Port Monitor subsystem 22 inserts the barcode represented by a bitmap into a predefined position into the EMF or XPS print data stream.

The Generate Text stream subsystem 14 reads the EMF data stream. The EMF data stream contains well defined records. The records are parsed by a computational methodology using a C and C++ programming language to extract ASCII or UNICODE text data from the EMF records. The extracted ASCII or UNICODE text data is written to a memory buffer by the virtual printer driver 10 for the Regular Expression subsystem.

The Generate Text stream subsystem 14 reads the XPS data stream. The XPS data stream contains well defined records. The records are parsed by a computational methodology using a C and C++ programming language to extract ASCII or UNICODE text data from the EMF records. The extracted ASCII or UNICODE text data is written to a memory buffer by the virtual printer driver 10 for the Regular Expression subsystem 12.

The Regular Expression subsystem 12 is using a well-defined Regular Expression parser. In computing, a regular expression is a specific pattern that provides concise and flexible means to "match" (specify and recognize) string of text, such as particular characters, words, or patterns of characters. The regular expression subsystem relies, in one embodiment, on Microsoft Corporation "wregex" regular expression class library to parse the text data Y generated by the virtual printer driver 10 during printing. Barcode subsystems 16 consist of a Dynamically Linked Library (DLL) 32 written in C++ programming language of executable code to convert ASCII or Binary text data, based on well-defined barcode standard specification, See Table 1. to a barcode represented by a bitmap. The barcode DLL 32 uses an API to receive input data and to converts the ASCII text or UNICODE text data to a variety of barcode types defined by barcode standards. The barcode standards utilized are listed in Table 1.

TABLE 1

| Barcode Standards |
|---|
| QR |
| Data Matrix |
| PDF417 |
| Code 128 |
| EAN 8 |
| EAN 13 |
| UPC-A |
| UPC-E |
| Codabar |
| Code 11 |
| Code 3 of 9 |
| Industrial 2 from 5 |
| Interleave 2 from 5 |
| Matrix 2 from 5 |
| Plessey |

The Virtual printer driver User Interface 30 consists of one or more Windows that defines user interaction with the virtual printer driver 10 software, specifically to control certain characteristics of the virtual printer driver 10 printing processes defined by a User. The User can determine the Barcode type, size, location on the printed document, and the source of ASCII or UNICODE text data to be used by the virtual printer driver 10 for printing. The User can enter ASCII or UNICODE text data to be used for barcode computation. The ASCII or UNICODE text data is stored in memory to be inserted into the print stream into a specific position for every printed document.

The Port Monitor Subsystem 22 is the last stage of processing the printed data. The Port Monitor subsystem 22 converts the printed page content represented by EMF or XPS data to a format that can be transferred to a physical printing devise or to a storage device as a file. The format can be, including but not limited to, a device specific command language or a file format PDF, HTML, XML, JPEG, TIFF, PNG, or GIF.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of printing a barcode computed based on content of a printed page data system on a document, said method comprising:

using a methodology of regular expression;

applying a regular expression subsystem to text contained in a print stream generating data;

converting said data to a barcode applying barcode computation, to produce a bitmap barcode representing the barcode;

inserting the bitmap barcode into an Enhanced Meta File (EMF) print stream defined by the printing system in the Port Monitor or Print Processor subsystem;

inserting the bitmap barcode into an XML Paper Specification (or XPS) print stream defined by the printing system in the Port Monitor or Print Processor subsystem; and combining the barcode with the print stream to contain the barcode in a specific position in the print stream in the Port Monitor or Print Processor subsystem.

2. The method of claim 1 further comprising controlling a characteristic of the printing process via a user interface.

3. The method of claim 2 wherein said characteristic is at least one characteristic selected from the group of characteristics consisting of the Barcode type, size, location on the printed document, and the source of ASCII or UNICODE text data.

4. The method of claim 1 wherein said print stream outputs a computer file.

5. The method of claim 4 wherein said computer file is in a format selected from the group of formats consisting of PDF, HTML, XML, JPEG, TIFF, PNG, and GIF.

6. A system for the printing of a barcode derived from the content of a printed page data system on a document, said system comprising:
 a print driver;
 a generate text subsystem generating a stream of text from a file being printed by said print driver;
 a regular expression subsystem reading said text and providing a set of text data;
 a barcode computing module converting said text data to a barcode bitmap;
 a port monitor subsystem receiving said barcode bitmap and inserting said barcode bitmap in a predefined position in a print data stream.

7. The system of claim 6 further comprising a print driver user interface allowing a user to modify characteristics of the print driver.

8. The system of claim 6 wherein said barcode subsystem comprises a dynamically linked library.

9. The system of claim 8 wherein said dynamically linked library comprises executable computer code to convert ASCII and/or binary text data to a barcode using a barcode standard specification.

10. The system of claim 9 wherein said print driver further comprises an application programming interface.

\* \* \* \* \*